(12) United States Patent
Zeller et al.

(10) Patent No.: US 10,147,979 B2
(45) Date of Patent: Dec. 4, 2018

(54) BATTERY PACK WITH CELL FIXING APPARATUS

(71) Applicant: HUSQVARNA AB, Huskvarna (SE)

(72) Inventors: Tobias Zeller, Neu-Ulm (DE); Joachim Rief, Ehingen (DE); Erik Felser, Erbach (DE); Stefan Keller, Neu-Ulm (DE)

(73) Assignee: HUSQVARNA AB, Huskvarna (SE)

( * ) Notice: Subject to any disclaimer, the term of this patent is extended or adjusted under 35 U.S.C. 154(b) by 4 days.

(21) Appl. No.: 15/104,550

(22) PCT Filed: Dec. 17, 2013

(86) PCT No.: PCT/SE2013/051538
§ 371 (c)(1),
(2) Date: Jun. 15, 2016

(87) PCT Pub. No.: WO2015/094035
PCT Pub. Date: Jun. 25, 2015

(65) Prior Publication Data
US 2017/0025717 A1    Jan. 26, 2017

(51) Int. Cl.
*H01M 10/42* (2006.01)
*H01M 2/10* (2006.01)
(Continued)

(52) U.S. Cl.
CPC ....... *H01M 10/4257* (2013.01); *H01M 2/105* (2013.01); *H01M 2/1022* (2013.01);
(Continued)

(58) Field of Classification Search
CPC .......... H01M 10/4257; H01M 2/1022; H01M 2/105; H01M 2/1055; H01M 2/204;
(Continued)

(56) References Cited

U.S. PATENT DOCUMENTS 5,188,536 A * 2/1993 Ganthier .............. H01R 12/714
439/406
5,213,513 A * 5/1993 Brown ................... H01R 13/24
310/355
(Continued)

FOREIGN PATENT DOCUMENTS

EP    2187465 A1    5/2010
EP    2337111 A2    6/2011
(Continued)

OTHER PUBLICATIONS

"Replacing the Battery in an Ensoniq ESQ-1," accessed at http://redfaux.typepad.com/the_redfaux_transmission/2010/02/replacing-the-battery-in-an-ensoniq-esq1.html, accessed on Feb. 15, 2010, all enclosed pages cited.
(Continued)

*Primary Examiner* — Gregg Cantelmo
(74) *Attorney, Agent, or Firm* — McNair Law Firm, P.A.

(57) ABSTRACT

A battery pack may include a plurality of cells arranged substantially adjacent to each other such that longitudinal centerlines of each of the cells are aligned substantially in parallel with each other in a first direction, a physical cell connection assembly that includes a cell-retaining portion disposed to contact each of the cells to hold the cells in a housing, an electrical cell connection assembly that includes a plurality of cell connectors disposed to contact at least selected ones of the cells in groups to facilitate electrical connection of the cells associated with each of the groups, a contact portion of each of the cell connectors being disposed to electrically connect electrodes of at least two of the cells, and a printed circuit board (PCB) configured to monitor electrical parameters associated with the cells based on electrical communication between the PCB and the electrical cell connection assembly.

20 Claims, 6 Drawing Sheets

(51) Int. Cl.
  *H01M 10/48* (2006.01)
  *H01M 10/04* (2006.01)
  *H01M 10/0525* (2010.01)
  *H01M 10/054* (2010.01)
  *H02K 11/00* (2016.01)
  *H01M 2/20* (2006.01)

(52) U.S. Cl.
  CPC ......... *H01M 2/1055* (2013.01); *H01M 2/204* (2013.01); *H01M 10/0422* (2013.01); *H01M 10/054* (2013.01); *H01M 10/0525* (2013.01); *H01M 10/425* (2013.01); *H01M 10/482* (2013.01); *H02K 11/0094* (2013.01); *H01M 2220/30* (2013.01)

(58) Field of Classification Search
  CPC ......... H01M 10/0422; H01M 10/0525; H01M 10/054; H01M 10/425; H01M 10/482; H01M 2220/30; H02K 11/0094
  See application file for complete search history.

(56) References Cited

U.S. PATENT DOCUMENTS

| | | | |
|---|---|---|---|
| 5,903,154 A | 5/1999 | Zhang et al. | |
| 6,262,636 B1* | 7/2001 | McLain | H03H 7/482 333/100 |
| 6,324,339 B1* | 11/2001 | Hudson | H02J 7/0011 318/499 |
| 7,479,786 B2 | 1/2009 | Woo et al. | |
| 7,807,289 B2 | 10/2010 | Seiler et al. | |
| 8,080,331 B2 | 12/2011 | Naito | |
| 8,841,018 B2 | 9/2014 | Nakano et al. | |
| 2008/0254356 A1 | 10/2008 | Liersch et al. | |
| 2010/0047676 A1 | 2/2010 | Park et al. | |
| 2012/0052332 A1* | 3/2012 | Ahn | H01M 2/202 429/7 |
| 2012/0064377 A1 | 3/2012 | Ro | |

FOREIGN PATENT DOCUMENTS

| | | | |
|---|---|---|---|
| EP | 2355205 A1 | 8/2011 | |
| JP | S62211857 A | 9/1987 | |
| JP | H04136865 U | 12/1992 | |
| JP | H07320708 A | 12/1995 | |
| JP | 2004319423 A | 11/2004 | |
| JP | 2006196277 A | 7/2006 | |
| JP | 2010146879 A | 7/2010 | |
| JP | 2013022022 A | 2/2013 | |
| JP | 2013071219 A | 4/2013 | |
| JP | 2013114780 A | 6/2013 | |
| JP | 2013165067 A | 8/2013 | |
| JP | 2013177106 A | 9/2013 | |
| KR | 20070033834 A | 3/2007 | |
| KR | 100816183 B1 * | 3/2008 | |
| WO | 0139351 A2 | 5/2001 | |
| WO | 2008038916 A1 | 4/2008 | |
| WO | 2011096863 A1 | 8/2011 | |
| WO | 2012077404 A1 | 6/2012 | |
| WO | 2013026490 A1 | 2/2013 | |
| WO | 2013080136 A1 | 6/2013 | |
| WO | 2013131551 A1 | 9/2013 | |
| WO | 2013131588 A2 | 9/2013 | |
| WO | 2013139409 A1 | 9/2013 | |
| WO | 2013149668 A1 | 10/2013 | |

OTHER PUBLICATIONS

International Search Report and Written Opinion of PCT/SE2013/051538 dated Sep. 17, 2014, all enclosed pages cited.
Chapter I International Preliminary Report on Patentability of PCT/SE2013/051538 dated Jun. 21, 2016, all enclosed pages cited.

* cited by examiner

BATTERY PACK WITH CELL FIXING APPARATUS

TECHNICAL FIELD

Example embodiments generally relate to battery pack technology, and more particularly, relate to battery packs employing improved techniques for connecting cell-connectors to the printed circuit board (PCB) and measuring cell parameters.

BACKGROUND

Property maintenance tasks are commonly performed using various tools and/or machines that are configured for the performance of corresponding specific tasks. Certain tasks, like cutting trees, trimming vegetation, blowing debris and the like, are typically performed by hand-held tools or power equipment. The hand-held power equipment may often be powered by gas or electric motors. Until the advent of battery powered electric tools, gas powered motors were often preferred by operators that desired, or required, a great deal of mobility. Accordingly, many walk-behind or ride-on outdoor power equipment devices, such as lawn mowers, are often powered by gas motors because they are typically required to operate over a relatively large range. However, as battery technology continues to improve, the robustness of battery powered equipment has also improved and such devices have increased in popularity.

The batteries employed in hand-held power equipment may, in some cases, be removable and/or rechargeable assemblies of a plurality of smaller cells that are arranged together in series and/or parallel arrangements in order to achieve desired output characteristics. However, when these cells are arranged together to form battery packs, it is important to consider that cells may have different characteristics that develop over time and could impact interactions between the cells. For example, if one cell begins to deteriorate or fail, it may impact other cells. Furthermore, if one or more cells are exposed to pressure stresses that cause a failure of the cell(s), other cells may be impacted and the entire battery pack may be damaged or fail. Thus, it may be useful to measure cell parameters to detect situations that may lead to cell damage.

To avoid damage to battery packs, it may be important to consider employing design features that can either prevent or reduce the likelihood of failure. Given that battery packs are often assembled in stages, it should be appreciated that welding or soldering of some components may occur in these stages. If the components are not properly aligned when the welding or soldering occurs, the resulting joints may be susceptible to damage or failure when the battery pack experiences vibration or impact during the course of operation. Thus, it may be helpful relative to the provision of design features that mitigate or prevent damage, to ensure that these welds or solder joints can be made with improved quality and consistency during the manufacturing process. It may further be helpful if the design can also lend itself to making useful measurements of cell parameters.

BRIEF SUMMARY OF SOME EXAMPLES

Some example embodiments may provide a battery pack that is configured such that the electrical connection components serve a dual function. In this regard, for example, the dual function may include providing electrical connection of the cells and a printed circuit board of the battery pack, and also include enhancing connection of cell connectors to the PCB while, in some cases, also enhancing the ability to monitor cell parameters (e.g., based on current measurement). The stages of assembly may therefore include intermediate mechanical fixation of components of the battery pack so that, for example, weld or solder joints that are formed will be made on components that are already properly aligned, or at least have a greater likelihood of being properly aligned. Overall battery pack robustness and manufacturing quality may therefore be improved.

In accordance with an example embodiment, a battery pack is provided. The battery pack may include a plurality of cells arranged substantially adjacent to each other such that longitudinal centerlines of each of the cells are aligned substantially in parallel with each other in a first direction, a physical cell connection assembly that includes a cell-retaining portion disposed to contact each of the cells to hold the cells in a housing, an electrical cell connection assembly that includes a plurality of cell connectors disposed to contact at least selected ones of the cells in groups to facilitate electrical connection of the cells associated with each of the groups, a contact portion of each of the cell connectors being disposed to electrically connect electrodes of at least two of the cells, and a printed circuit board (PCB) configured to monitor electrical parameters associated with the cells based on electrical communication between the PCB and the electrical cell connection assembly. At least one cell connector of the cell connection assembly may include a holding portion that engages the physical cell connection assembly and a fixing portion that extends substantially perpendicular to the plane of the PCB to engage the PCB to facilitate holding of the PCB relative to the physical cell connection assembly.

In another example embodiment, outdoor power equipment including an electric motor, a working assembly powered by the electric motor, and a battery pack configured to power the electric motor is provided. The battery pack may include a plurality of cells arranged substantially adjacent to each other such that longitudinal centerlines of each of the cells are aligned substantially in parallel with each other in a first direction, a physical cell connection assembly that includes a cell-retaining portion disposed to contact each of the cells to hold the cells in a housing, an electrical cell connection assembly that includes a plurality of cell connectors disposed to contact at least selected ones of the cells in groups to facilitate electrical connection of the cells associated with each of the groups, a contact portion of each of the cell connectors being disposed to electrically connect electrodes of at least two of the cells, and a printed circuit board (PCB) configured to monitor electrical parameters associated with the cells based on electrical communication between the PCB and the electrical cell connection assembly. At least one cell connector of the cell connection assembly may include a holding portion that engages the physical cell connection assembly and a fixing portion that extends substantially perpendicular to the plane of the PCB to engage the PCB to facilitate holding of the PCB relative to the physical cell connection assembly.

Some example embodiments may improve the performance and/or the efficacy of battery powered equipment by increasing the durability and reliability of the battery pack.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Figure 1:
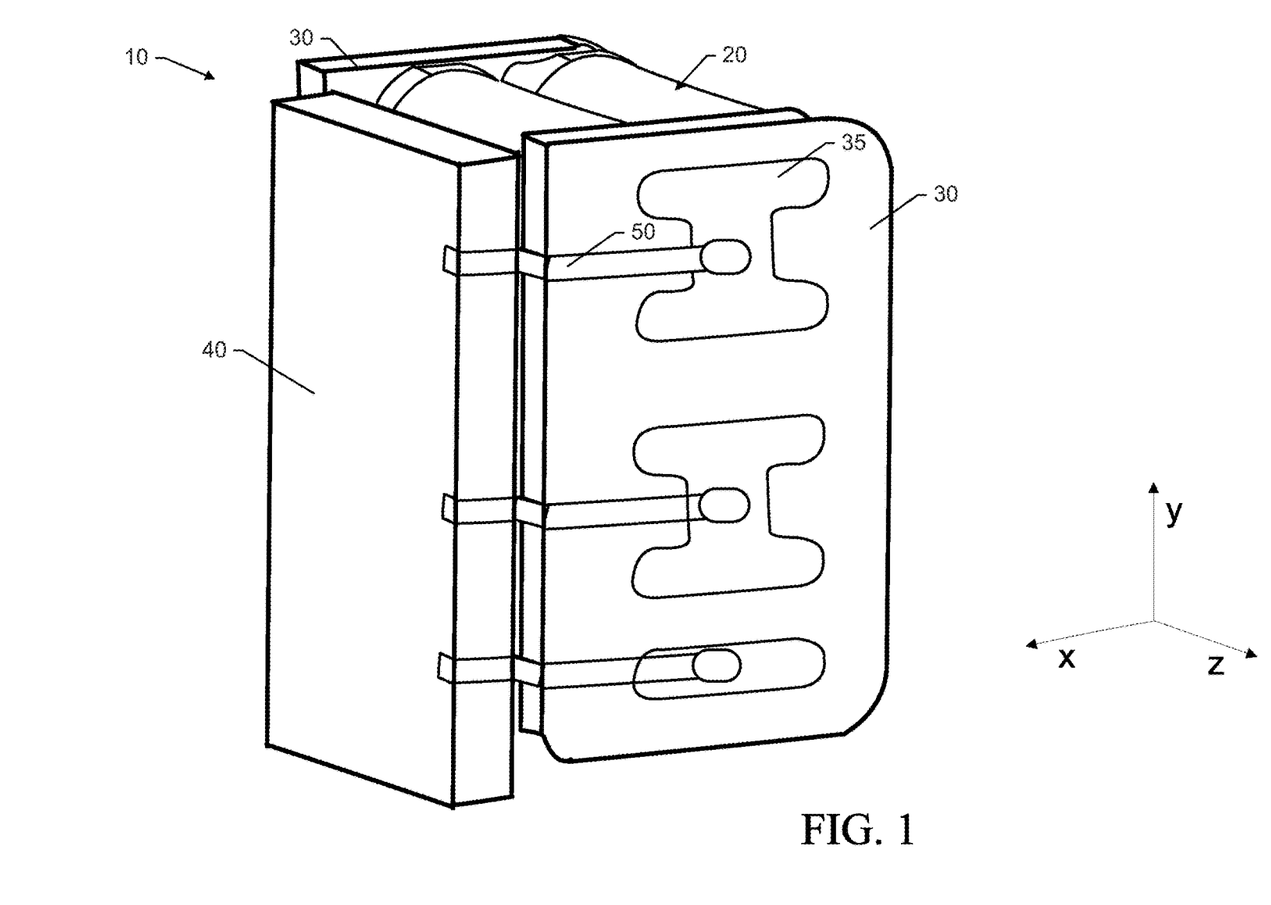
FIG. 1 illustrates a perspective view of one example of a cell connector assembly that may be employed to connect groups of series connected cells in parallel.

Some example embodiments may provide for a battery pack that can be useful in connection with battery powered tools or battery powered outdoor power equipment. Outdoor power equipment that is battery powered, and battery powered tools, typically include battery packs that include a plurality of individual cells. In order to achieve sufficient power, cells are organized and interconnected (e.g., in a series of series and/or parallel connections) to group the cells in a manner that achieves desired characteristics. FIG. 1 illustrates a basic example of a perspective view of a battery pack 10. The battery pack 10 includes a plurality of individual cells 20. Each of the cells 20 may be any suitable type of battery cell. For example, the cells 20 may be nickel-metal hydride (NiMH), nickel-cadmium (NiCd), lithium-ion (LIB), or other similar cells. Thus, in some cases, nominal cell voltages may range from about 1V to about 4V. Series connection of multiple cells may be used to increase the voltage rating of the group of connected cells, and parallel connection of multiple cells may be used to increase the power capacity of the battery pack.

As can be appreciated from FIG. 1, the cells 20 may be arranged substantially adjacent to each other such that longitudinal centerlines of each of the cells are aligned substantially in parallel with each other in a first direction (e.g., the Z-direction). Some of the cells may further be aligned with each other in columns (e.g., along the Y-direction) and rows (e.g., along the X-direction). In the example of FIG. 1, ten cells may be provided such that there are five cells in each of two columns. However, it should be appreciated that the number of cells and the arrangement thereof, may be different in various different embodiments.

In an example embodiment, the cells 20 may be held in place by a physical cell connection assembly 30. The physical cell connection assembly 30 may be a cell retainer structure that is configured to engage at least opposing ends of the cells to define an enclosure (though one can easily appreciate that all sides need not be fully enclosed) into which the cells 20 may be fixed. In some cases, the cells 20 may fit in slots formed in the physical cell connection assembly 30 to inhibit their movement. Moreover, in some cases, to further inhibit movement of the cells 20, the cells 20 may be welded into place in contact with the physical cell connection assembly 30. In some embodiments, the physical cell connection assembly 30 may be made of a non-conductive, rigid material (e.g., plastic). However, portions of the physical cell connection assembly 30 could be conductive in some cases.

The physical cell connection assembly 30 may also be augmented with an electrical cell connection assembly 35 that may include metallic plates or conductors that define individual cell connectors to engage electrodes of selected ones of the cells to facilitate grouping of the cells for electrical connectivity purposes. Groups of cells may therefore be series connected and/or parallel connected in any desirable arrangement via the electrical cell connection assembly 35. For example, cell connectors of the electrical cell connection assembly 35 may be connected to a positive electrode of each end one of the cells it its group and, to complete the parallel connection of these cells, a second cell connector (not shown) may also be connected to the negative electrode of the cells at opposite ends thereof. The group may then further be connected in series or parallel with other groups of cells.

In some embodiments, the physical cell connection assembly 30 may have openings provided therein for the electrical cell connection assembly 35 to engage with the electrodes of the cells 20. The electrical cell connector assemblies attached to the positive and negative terminals of the battery pack 10 may then be electrically connected to internal or external circuitry to provide power thereto. In some embodiments, several groups of parallel connected cells may be connected in series. Any combination of cell groups having more than one cell per group, and any number of groups could alternatively be employed in various example embodiments.

In the battery pack 10 of the example shown in FIG. 1, the output of the battery pack 10 may be desirably applied to some load, to some control circuitry or to a printed circuit board (PCB) such as PCB 40, which may include terminals for communicating the electrical output of the battery pack 10 to the load and/or control circuitry. The PCB 40 may be positioned along one side, on top of, below, or remotely relative to the cells 20 of the battery pack 10. As an example, in FIG. 1, the PCB 40 may be positioned proximate to one entire column of cells 20 and extend substantially between corresponding ends of the physical cell connector assembly 30.

The electrical cell connection assembly 35 may include a PCB connection portion 50 that may extend from individual cell connectors of the electrical cell connection assembly 35 to the PCB 40 to form electrical connections therebetween. The PCB 40 may then be used to arrange cell group connections in any desirable way and/or to monitor, manage, and/or control operation of the battery pack 10 relative to the delivery of output power to the load. The load may be a working assembly (e.g., cutting head, blade, blower fan, wheels, auger assembly, drive sprocket, or other drivable component) of outdoor power equipment configured to perform a yard maintenance task when operated.

The PCB connection portion 50 may be any cell-connector-tape or other conductor that is suitable to connect each of the corresponding cells 20 together electrically, by enabling the cell connectors of the electrical cell connection assembly 35 to be in communication with the PCB 40 for electrical connection in any desirable parallel or series connections. Thus, for example, the PCB connection portion 50 may be a metallic plate, bar, rod, conductive tape or other member that may be physically connected between battery terminals of the cells contacted and the PCB 40.

In some cases, the PCB connection portion 50 may be soldered or welded to the PCB 40 to facilitate fixing the battery pack 10 together as a robust structure. However, prior to the soldering or welding, the structure may be relatively loose or capable of movement. Thus, while soldering some joints, movement may occur in others that have yet to be soldered. This can result in some slight misalignments or less than ideal cell fixation that may introduce stresses that could cause solder joints to fail in the future. Accordingly, it may be desirable to provide a means by which to ensure that the PCB 40 and the physical cell connection assembly 30 are locked in connection with each other prior to beginning the soldering work on the electrical cell connection assembly 35. Some example embodiments may incorporate cell fixation functionality into the structure of the electrical cell connection assembly 35 so that the electrical cell connection assembly 35 can lock the PCB 40 together with the physical cell connection assembly 30 prior to the soldering being conducted.

FIGS. 2 to 6 illustrate example embodiments in which an electrical cell connection assembly is provided to include structural elements that can facilitate cell fixation (e.g., by locking) in cooperation with the physical cell connection assembly. In this regard, for example, the electrical cell connection assembly may include components that penetrate through the PCB to hold the PCB relative to the physical cell connection assembly in a fixed arrangement prior to soldering of the electrical cell connection assembly to the PCB. Vibrations and impacts on the battery pack may therefore be less likely to break connections and cause battery defects, and the positions of the cells and other battery pack components may be ensured to be in the proper alignment prior to soldering, welding or other permanent fixing techniques being employed. Some embodiments may also enable current measurement to be conducted via a portion of the electrical cell connection assembly so that a double-function of cell fixation and enabling cell parameter measurement (e.g., current measurement) may be accomplished.

Figure 2:
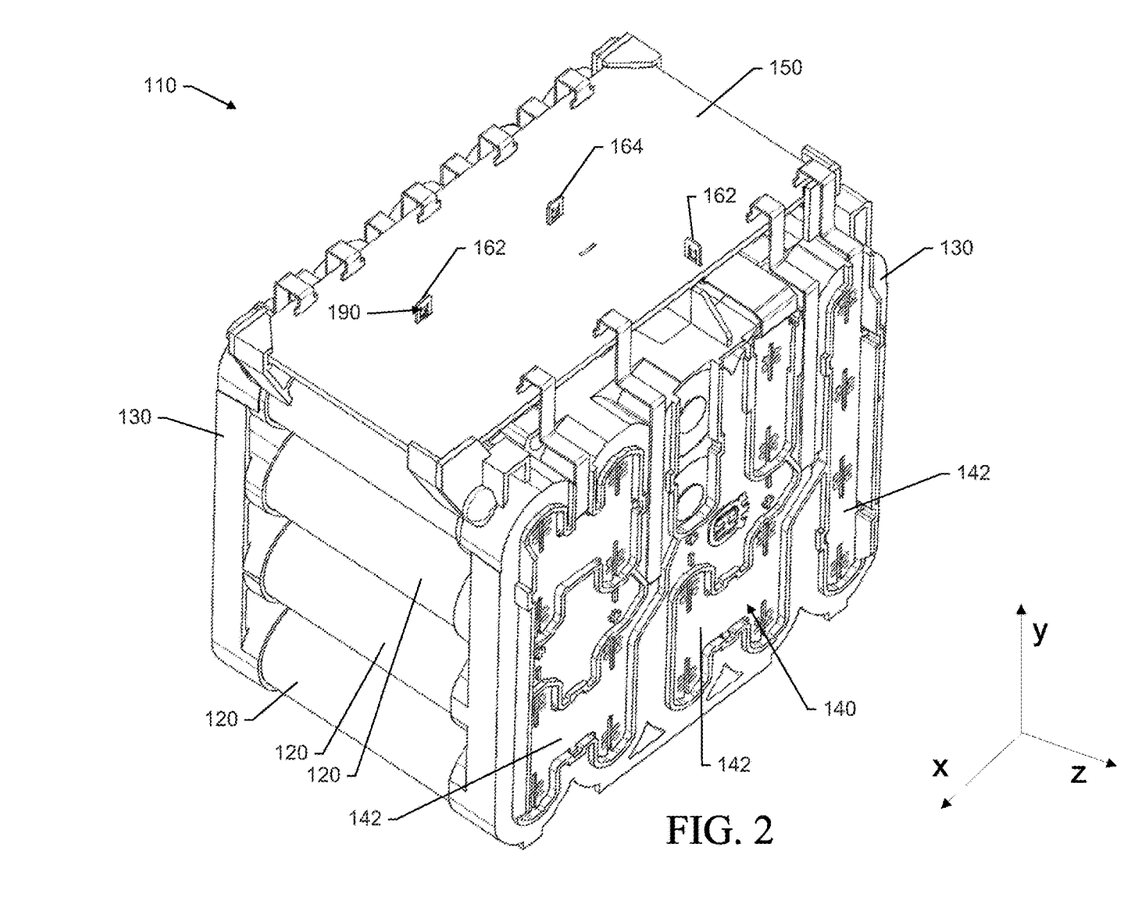
FIG. 2 illustrates a perspective view of an assembled battery pack in accordance with an example embodiment.
Figure 3:
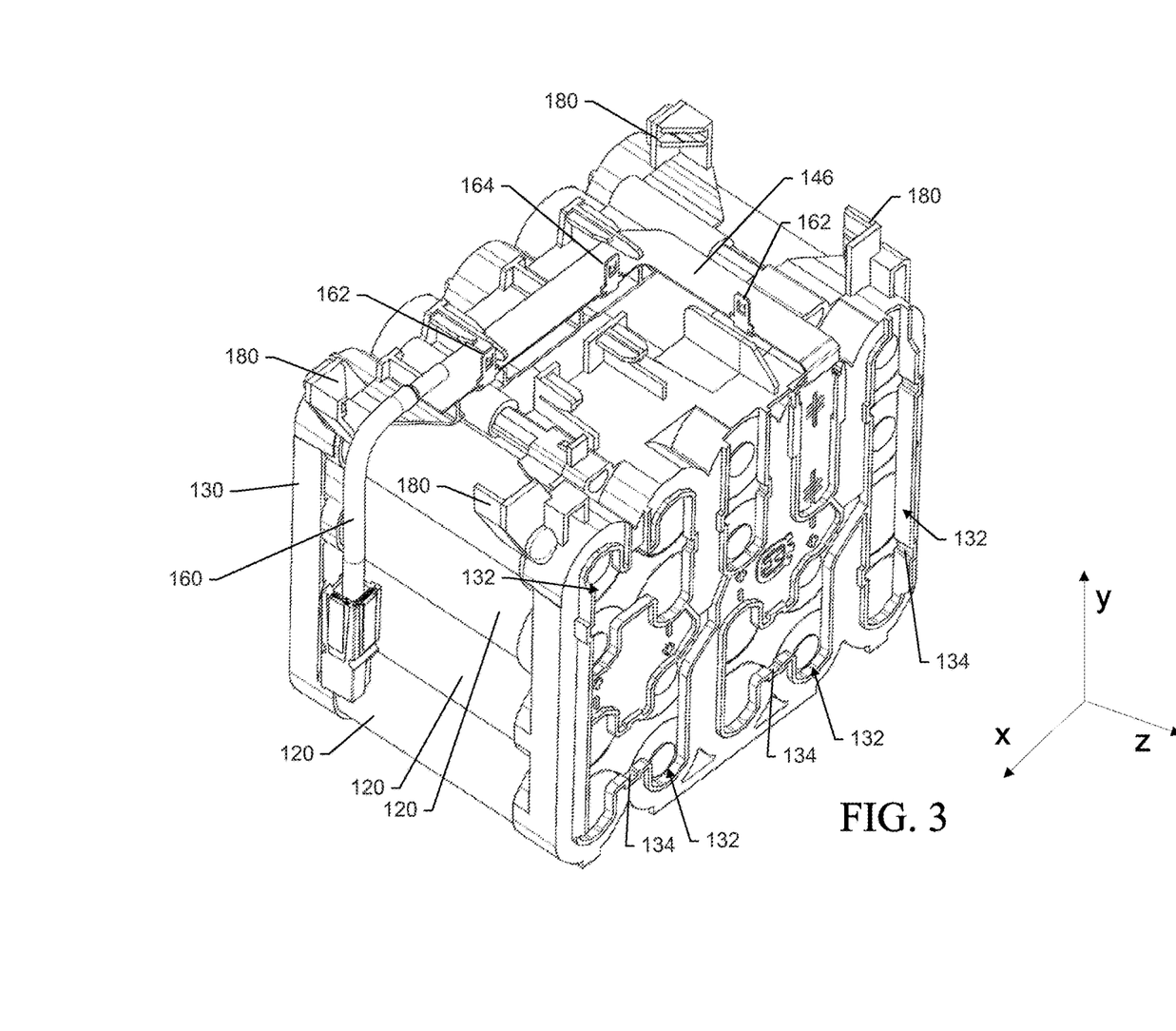
FIG. 3 illustrates a perspective view of the battery pack of FIG. 2 with the PCB and cell connectors removed to illustrate an output connector of an example embodiment.
Figure 4:
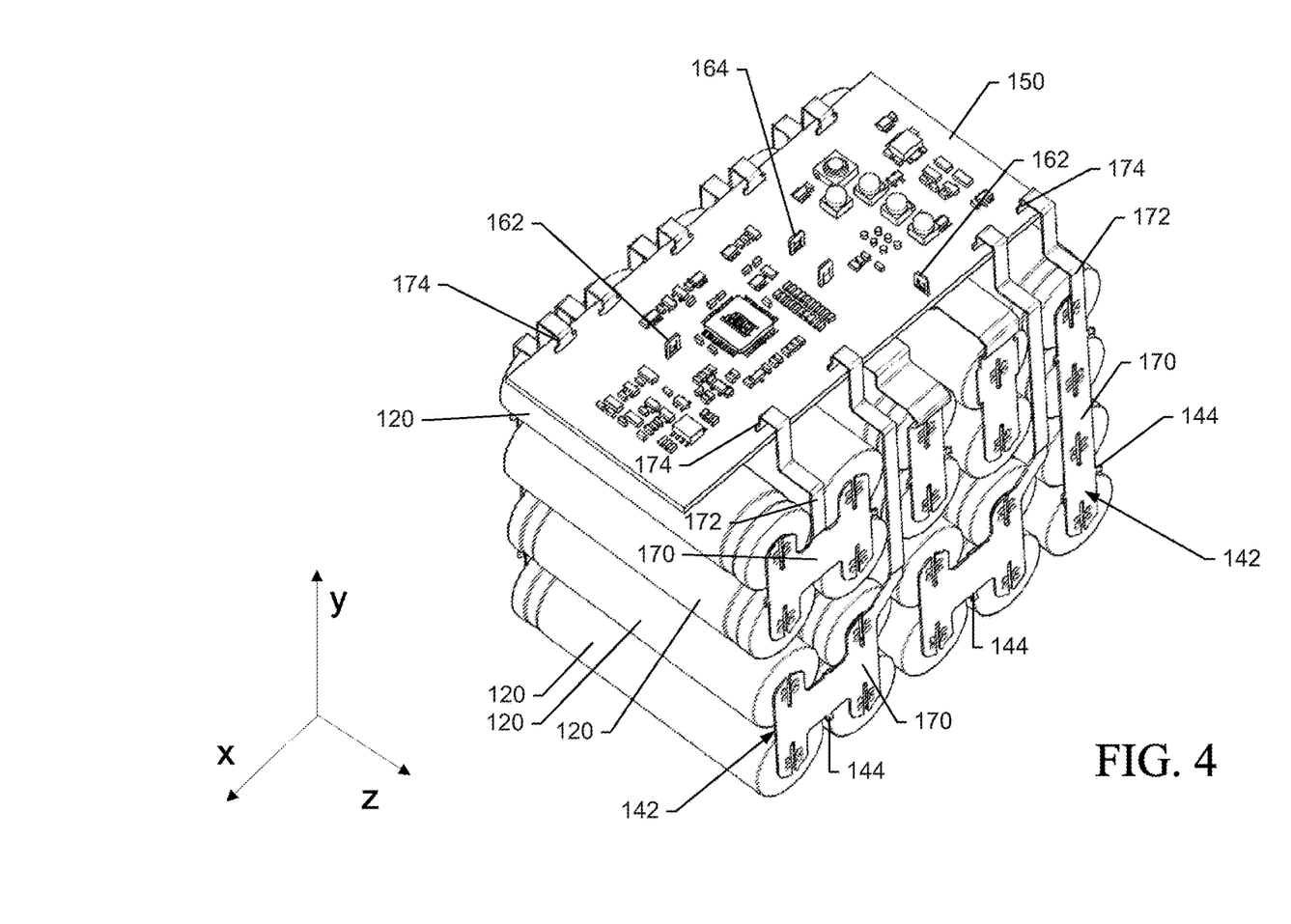
FIG. 4 illustrates a perspective view of the battery pack of FIG. 2 with the physical cell connection assembly removed to illustrate the cell connectors in accordance with an example embodiment.
Figures 5, 6:
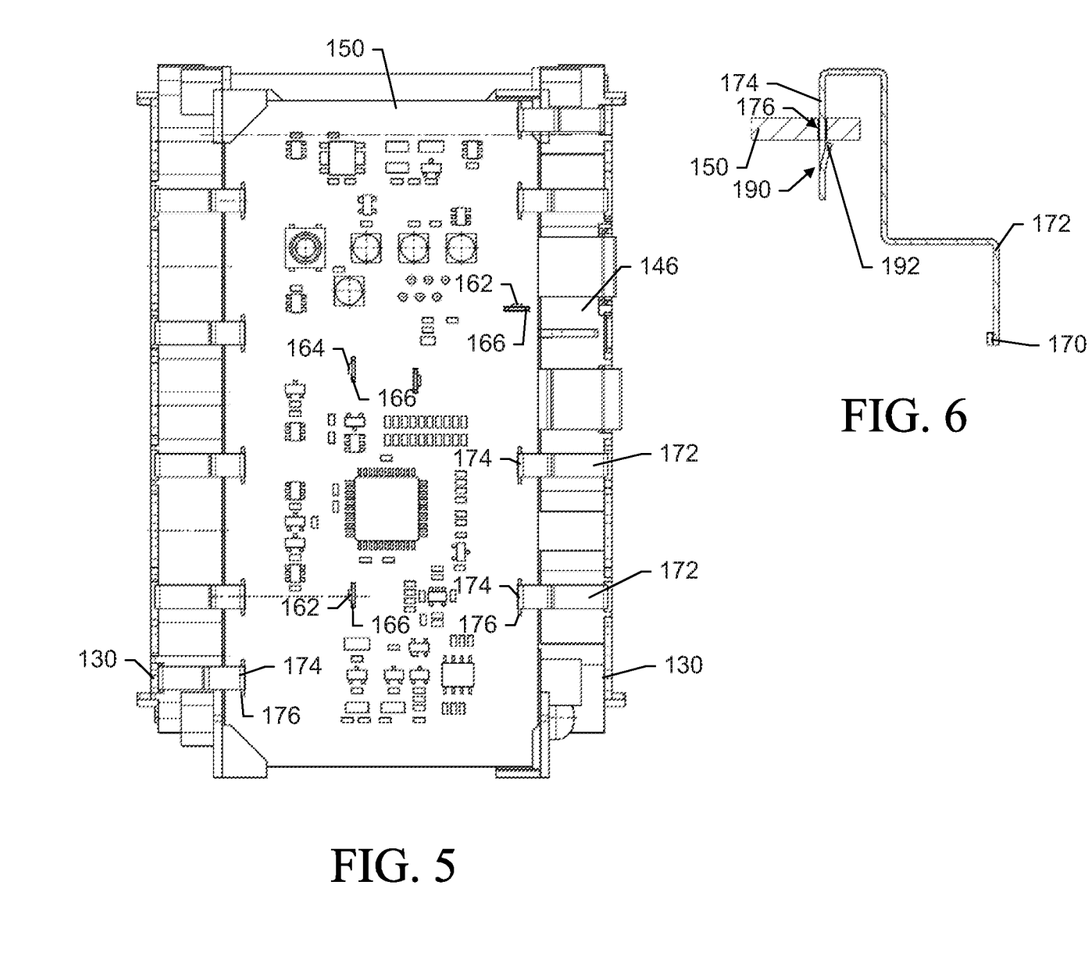
FIG. 5 illustrates a top view of the battery pack in accordance with an example embodiment.
FIG. 6 illustrates a side view of one of the cell connectors in accordance with an example embodiment.

FIG. 2 illustrates a perspective view of an assembled battery pack 110 in accordance with an example embodiment. FIG. 3 illustrates a perspective view of the battery pack 110 of FIG. 2 with the PCB and cell connectors removed to illustrate an output connector of an example embodiment. FIG. 4 illustrates a perspective view of the battery pack 110 of FIG. 2 with the physical cell connection assembly removed to illustrate the cell connectors in accordance with an example embodiment. FIG. 5 illustrates a top view of the battery pack 110 in accordance with an example embodiment, and FIG. 6 illustrates a side view of one of the cell connectors in accordance with an example embodiment. An example embodiment will now be described in reference to FIGS. 2-6.

As can be appreciated from FIG. 2, a battery pack 110 of an example embodiment may include a plurality of cells 120 may be arranged substantially adjacent to each other such that longitudinal centerlines of each of the cells are aligned substantially in parallel with each other in a first direction (e.g., the Z-direction). Some of the cells may further be aligned with each other in columns (e.g., along the Y-direction) and rows (e.g., along the X-direction). In the example of FIG. 2, twenty cells are provided such that there are five columns having four cells each. However, it should be appreciated that the number of cells and the arrangement thereof, may be different in various different example embodiments.

In an example embodiment, the cells 120 may be held in place by a physical cell connection assembly 130, which may be similar in structure to the physical cell connection assembly 30 described above. Thus, as mentioned above, the physical cell connection assembly 130 may be a cell retainer structure that is configured to engage at least opposing ends of the cells 120 to define an enclosure (which again can be appreciated as not needing to be fully enclosed) into which the cells 120 may be fixed. In some cases, the cells 120 may fit in slots formed in the physical cell connection assembly 130 to inhibit their movement.

The physical cell connection assembly 130 may also be augmented with an electrical cell connection assembly 140 that may include metallic plates or conductors that define individual cell connectors 142 that engage electrodes of selected ones of the cells to facilitate grouping of the cells for electrical connectivity purposes. Groups of cells may therefore be series connected and/or parallel connected in any desirable arrangement via the electrical cell connection assembly 140 in combination with a PCB 150. For example, cell connectors 142 of the electrical cell connection assembly 140 may be connected to a negative electrode of each end one of the cells it its group and, to complete the parallel connection of these cells, a second cell connector (not shown) may also be connected to the positive electrode of the cells at opposite ends thereof. The group may then further be connected in series or parallel with other groups of cells.

In some embodiments, the physical cell connection assembly 130 may have openings 132 (see FIG. 3) provided therein for the electrical cell connection assembly 130 to receive the electrical cell connection assembly 140 via receipt of individual ones of the cell connectors 142. Thus, the openings 132 may be substantially similarly shaped to the shape of the corresponding cell connectors 142. Moreover, in some embodiments, the openings 132 may include connector slots 134 that may enable protrusions 144 on the cell connectors 142 to be inserted therein to snap fit or otherwise provide a tight connection to hold the cell connectors 142 within the openings 132. The cell connectors 142 may be slightly enlarged relative to some conventional cell connectors in order to leverage the increased size to facilitate the cell fixation functions described herein.

In an example embodiment, one of the cell connectors 142 (e.g., the one of the cell connectors 142 from which the output of the battery pack 110 is extracted) may be different than other cell connectors 142 in that it may be used to facilitate interaction with sensing circuitry (e.g., for battery pack 110 output current measurement). FIG. 3 shows the other cell connectors 142 removed, and the PCB 150 removed to expose output connector 146. The output connector 146 may connect to the electrodes of one or more cells, but may also be connected to an output strap 160. The combined output of the battery pack 110 may be collected and delivered to the electric motor and/or working assembly of the device that is powered by the battery pack 110. Thus, the output strap 160 may connect to output terminals of the battery pack 110, which may then communicate with input terminals of the device that is to be powered when the battery pack 110 is installed for use.

Because the combined output of the battery pack 110 current passes through the output connector 146, the output connector 146 may be useful for determining a value of the combined output and/or for monitoring the combined output. In some embodiments, the output connector 146 may include soldering tabs configured to pass through the PCB 150. The soldering tabs may include at least two measurement tabs 162 and a fixing tab 164. However, the fixing tab 164 is not required. The measurement tabs 162 may be placed at portions of the output connector 146 that correlate to spaced apart and distally located points of overlap between the output connector 146 and the PCB 150, when the battery pack 110 is assembled. By locating the measurement tabs 162 as far apart as possible, they may be soldered to the PCB 150 to facilitate their electrical connection to sensing circuitry 210 (e.g., a current measurement circuit), and more accurate measurements (e.g., current measurements) may be determined based on the longer distance therebetween.

The measurement tabs 162 and the fixing tab 164 may also provide a fixing function since they may pass through preformed apertures 166 in the PCB 150. The preformed apertures 166 may be positioned such that at least one such aperture (i.e., the aperture that correlates to the measurement tab 162 that is closest to the cell electrodes) is proximate to an edge portion of the PCB 150, while at least one other aperture (i.e., at least the aperture that correlates to the fixing tab 164) is located centrally or spaced apart from edges of the PCB 150. This may allow for more holding strength to hold the assembled battery pack 110 together prior to soldering the soldering tabs to the PCB 150. In this regard, as can be appreciated from FIGS. 5-6, the apertures 166 may be sized to create a tight fit with the soldering tabs (e.g., the measurement tabs 162 and the fixing tab 164). Thus, when the PCB 150 is installed onto the output connector 146 such that the apertures 166 receive the measurement tabs 162 and the fixing tab 164, respectively, the PCB 150 may be held in place. As shown in FIGS. 5-6, the measurement tabs 162 and the fixing tab 164 may pass through the PCB 150 in a direction extending away from the cells 120.

The other cell connectors 142 may also be connected to the PCB 150 in a manner that provides cell fixation functionality. In this regard, for example, the cell connectors 142 may include a contact portion 170, a holding portion 172 and a fixing portion 174. The contact portion 170 of each of the cell connectors 142 may be disposed to extend in a direction that is substantially perpendicular to the first direction (e.g., in the X-Y plane) to electrically connect electrodes of at least two of the cells. The holding portion 172 may extend away from the contact portion 170 toward an edge of the PCB 150. In an example embodiment, the holding portion 172 may engage a portion of the physical cell connection assembly 130 to hold the physical cell connection assembly 130 and draw it toward the PCB 150 when the battery pack 110 is assembled. Meanwhile, the fixing portion 174 may penetrate through the PCB 150 (e.g., in a direction toward the cells 120, and therefore opposite the direction that the other connecting tabs or soldering tabs (measurement tabs 162 and the fixing tab 164) pass though the PCB 150) to engage and hold the PCB 150 relative to the physical cell connection assembly 130. The fixing portions 174 of all of the remaining soldering tabs may then be soldered.

In an example embodiment, as shown in FIG. 6, the contact portion 170 and the holding portion 172 may lie in parallel planes (or the same plane) and may extend parallel to a surface of the cell retainers of the physical cell connection assembly 130. The cell connector 142 may then bend substantially 90 degrees to extend along a side of the cell retainer until the cell connector 142 approaches the PCB 150 where the cell connector 142 may bend substantially 90 degrees back to extend past the plane of the PCB 150. The cell connector 142 may then form a C or U shape to bend back toward the cells 120 to enable the fixing portion 174 to pass through an aperture 176 formed in the PCB 150. The fixing portion 174, which may also be considered to be a connecting tab or soldering tab, may be soldered (or otherwise fixed) to the PCB 150 thereafter to complete electrical connection and facilitate fixing the PCB 150 with the cell retainers.

In an example embodiment, any (or all) of the soldering tabs may include a retaining clip 190 disposed thereon. The retaining clips 190 of some embodiments may each include a retention tab 192 that is compressed by insertion of the retaining clip 190 through the PCB 150. The retention tab 192 may then expands responsive to the retention tab 192 penetrating through to an opposite side of the PCB 150 relative to a side of the PCB 150 through which the retention tab 192 is inserted. In other words, the retention tab 192 may enable the retaining clip 190 to provide a snap fit with the PCB 150 such that the retention tab 192 has a compressed state where the retention tab 192 is slid through one of the apertures (166/176), and an expanded state that prevents withdrawal of the retaining clip 192 from the PCB 150 unless the retention tab 192 is manually depressed (e.g., by an operator).

Accordingly, assembly of the battery pack 110 may include the arrangement of the cells 120 in one cell retainer of the physical cell connection assembly 130, followed by attachment of the other cell retainer. The output connector 146 may then be provided to contact its corresponding cells and to lay along one side of the arranged cells 120 as shown in FIG. 3. The PCB 150 may then be placed over the output connector 146 such that the soldering tabs (measurement tabs 162 and the fixing tab 164) are inserted in their respective apertures 166. If retaining clips 190 are provided on the soldering tabs, the retaining clips 190 may snap in place and further hold the soldering tabs. In some cases a portion of the physical cell connection assembly 130 may also guide receipt and alignment of the PCB 130 (see guide rails 180). The soldering tabs (e.g., measurement tabs 162 and the fixing tab 164) may be soldered to the PCB 150 at this time. However, this soldering may be delayed, if desired, since the PCB 150 will be held in place by the soldering tabs (via their rigid engagement with one cell retainer of the physical cell connection assembly 130 and with the PCB 150). The other cell connectors 142 may then be inserted into openings 132 such that the protrusions 144 fit or snap into the connector slots 134 to hold the contact portions 170 in place. The contact portions 170 may contact the electrodes of the cells 120 and may, in some cases, be welded to the cells 120. Meanwhile, the holding portions 172 may draw the opposing cell retainers of the physical cell connection assembly 130 toward each other when the fixing portions 174 are snapped into the respective apertures 176 that are formed around opposite edges of the PCB 150 (i.e., opposite edges that are proximate to the cell electrodes of adjacent cells). Soldering of remaining soldering tabs (e.g., the fixing portions 174 of the cells connectors 142) may then be accomplished to complete the assembly. If desired, the battery pack 110 may be provided in a housing that may be insertable into a backpack or into outdoor power equipment.

Figure 7:
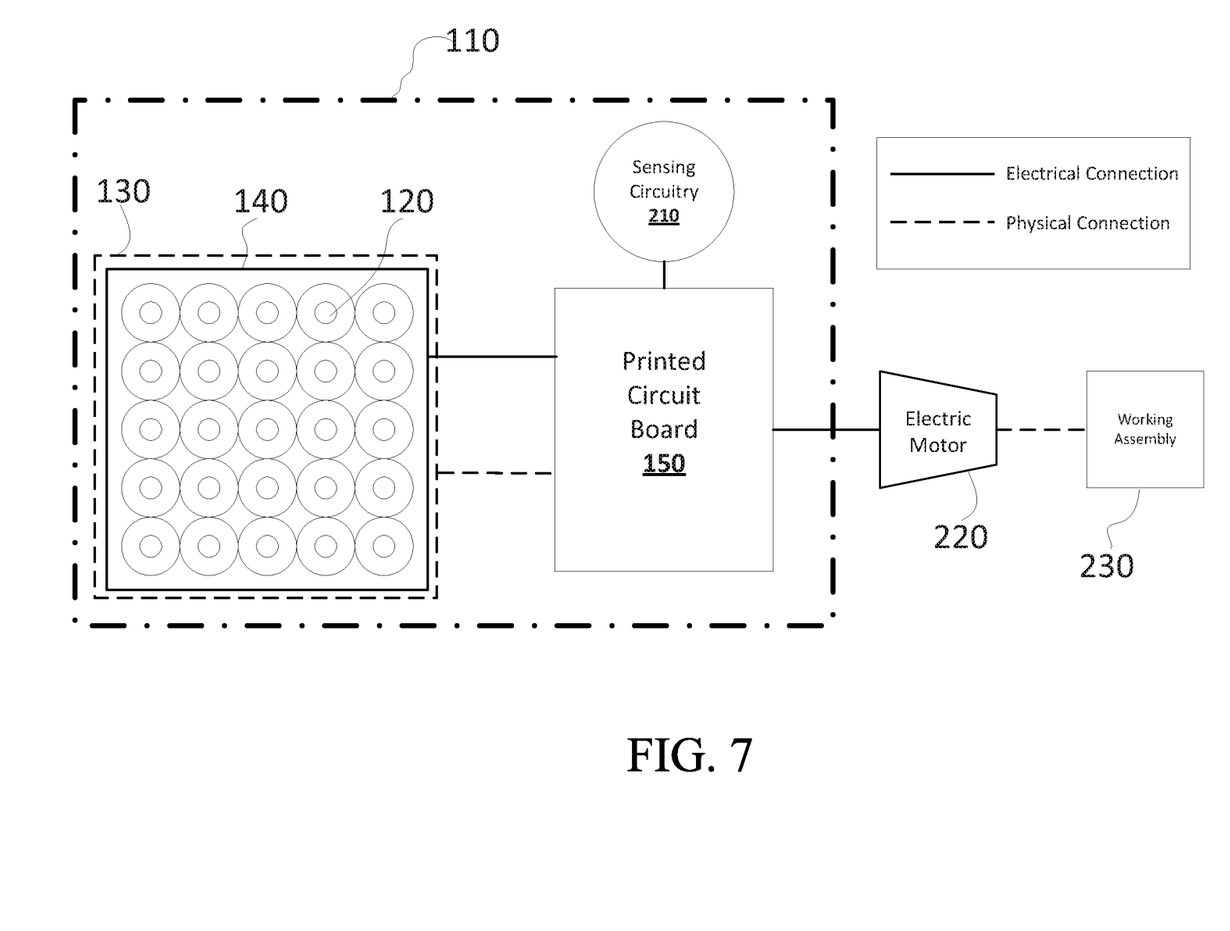
FIG. 7 illustrates a block diagram of outdoor power equipment that may be powered by the battery pack of an example embodiment.

FIG. 7 illustrates a block diagram of outdoor power equipment 200 that may be powered by the battery pack 110 of an example embodiment. As shown in FIG. 7, the battery pack 110 may include the physical cell connection assembly 130 and the electrical cell connection assembly 140. The electrical cell connection assembly 140 may electrically connect the cells 120 to the PCB 150, but may also assist the physical cell connection assembly 130 relative to holding the components of the battery pack 110 in place and in proper alignment prior to the soldering of such components. Thus, quality soldering joints may be achieved that are less likely to fail in the future due to impact or inherent stresses created by soldering with misalignments in place. Sensing circuitry 210 may also be provided to monitor the output current provided to an electric motor 220 of the equipment 200 and/or a working assembly 230 of the equipment 200. The current measurement may be accomplished by determining a voltage drop between two points on the output connector 146 (i.e., between the measurement tabs 162). In an example embodiment, the electrical connections formed by the electrical cell connection assembly 140 are formed using structural elements that contribute to the cell fixation capabilities of the physical cell connection assembly 130. Moreover, the electrical cell connection assembly 140 may provide a coupling apparatus for the sensing circuitry 210 to measure the output current using the dual function output connector 146, which performs electrical connection for current measurement functions and also provides a structure for enhanced fixation of the PCB 150.

Example embodiments employ a mechanical locking mechanism to facilitate pre-positioning of cell connectors to correct positions. The assembly process for the battery pack may therefore be improved and simplified, and manufacturing quality may be increased. The mechanical locking mechanism employed by example embodiments may also reduce the risk that vibration and impact may break or damage soldering connections on the battery packs. In one embodiment, a portion of the locking mechanism (e.g., an output connector) may further be configured to interface with sensing circuitry further stabilizing the connection between the PCB and the sensing circuitry. Thus, in reference to FIG. 7, the connection between the sensing circuitry 210 and the PCB 150 may actually be incorporated as a part of the physical connection between the PCB 150 and the cells 120 to reduce the influence on soldered joints that may be provided by impact and vibration.

A battery pack of an example embodiment may therefore include a plurality of cells arranged substantially adjacent to each other such that longitudinal centerlines of each of the cells are aligned substantially in parallel with each other in a first direction, a physical cell connection assembly that includes a pair of cell-retaining portions, each of which is disposed to contact a respective opposite end of each of the cells to define a housing for substantially enclosing the cells in the housing, an electrical cell connection assembly that includes a plurality of cell connectors disposed to contact at least selected ones of the cells in groups to facilitate electrical connection of the cells associated with each of the groups, a contact portion of each of the cell connectors being disposed to extend in a direction that is substantially perpendicular to the first direction to electrically connect electrodes of at least two of the cells, and a printed circuit board (PCB) configured to monitor electrical parameters associated with the cells based on electrical communication between the PCB and the electrical cell connection assembly. The PCB may extend along one side of the cells in a plane substantially parallel to the first direction. At least one cell connector of the cell connection assembly may include a holding portion that engages the physical cell connection assembly and a fixing portion that extends substantially perpendicular to the plane of the PCB to engage the PCB to facilitate holding of the PCB relative to the physical cell connection assembly.

The battery pack of some embodiments may include additional features that may be optionally added either alone or in combination with each other. In this regard, each numbered feature below may be added to the battery pack either alone or in combination with any selected other one, or even all, of the other numbered features. For example, in some embodiments, (1) the fixing portion may include at least one soldering tab configured to pass through a preformed aperture in the PCB. In some cases, (2) the fixing portion may further include a retaining clip that secures the at least one cell connector to the PCB. In an example embodiment, (3) the soldering tab may be soldered, welded, or otherwise fastened to the PCB after being secured with the retaining clip. In some embodiments, (4) the retaining clip may include a retention tab that is compressed by insertion of the retaining clip through the PCB and that expands responsive to the retention tab penetrating through to an opposite side of the PCB relative to a side of the PCB through which the retention tab is inserted. The retention tab may, while in an expanded state, prevent withdrawal of the retaining clip from the PCB. In some cases, (5) the PCB may further include sensing circuitry that monitors operation of the battery pack. In an example embodiment, (6) the fixing portion may include two soldering tabs, and the sensing circuitry may be configured to monitor the common output via electrical connection between the two soldering tabs. In some examples, (7) the fixing portion may include an additional soldering tab for three point mechanical support relative to fixing the PCB prior to soldering the fixing portion to the PCB. In some cases, (8) the two soldering tabs may be disposed proximate to opposite ends of the fixing portion. In an example embodiment, (9) the two soldering tab may be soldered, welded, or otherwise fastened to the PCB after being provided through corresponding apertures in the PCB. In some embodiments, (10) fixing portions of at least some cell connectors may engage the PCB proximate to a first end of the PCB and fixing portions of at least some other cell connectors may engage the PCB proximate to a second end of the PCB that is opposite of the first end of the PCB. In some examples, (11) the fixing portion of the at least one cell connector may include at least two soldering tabs that penetrate through the PCB in a direction away from the cells. In such an example, at least some others of the cell connectors may each include corresponding fixing portions. The corresponding fixing portions may penetrate through the PCB in a direction toward the cells. In some cases, (12) at least one of the at least two soldering tabs may penetrate the PCB at a portion of the PCB that is spaced apart from edges of the PCB that are penetrated by the corresponding fixing portions. In some embodiments, (13) the corresponding fixing portions each include a respective retaining clip. Each retaining clip may include a retention tab that is compressed by insertion through the PCB and that expands responsive to the retention tab penetrating through to an opposite side of the PCB relative to a side of the PCB through which the retention tab is inserted. The retention tab may, in an expanded state, prevent withdrawal of the retention tab from the PCB in a direction opposite to an insertion direction In some embodiments, any or all of the items (1) to (13) above may be provided individually or in combination with each other and the battery pack may be provided in a backpack that is wearable by an operator to power outdoor power equipment.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A battery pack comprising:
   a plurality of cells arranged substantially adjacent to each other such that longitudinal centerlines of each of the cells are aligned substantially in parallel with each other in a first direction;
   a physical cell connection assembly that includes a cell-retaining portion disposed to contact each of the cells to hold the cells in a housing;
   an electrical cell connection assembly that includes a plurality of cell connectors disposed to contact at least selected ones of the cells in groups to facilitate electrical connection of the cells associated with each of the groups, a contact portion of each of the cell connectors being disposed to electrically connect electrodes of at least two of the cells;
   a printed circuit board (PCB) comprising sensing circuitry and configured to monitor electrical parameters associated with the cells based on electrical communication between the PCB and the electrical cell connection assembly; and
   an output connector including two soldering tabs, each of the two soldering tabs being configured to pass through a preformed aperture in the PCB,
   wherein the sensing circuitry is configured to monitor a common output of the battery pack via electrical connection between the two soldering tabs,
   wherein at least one cell connector of the plurality of cell connectors includes a holding portion that engages the physical cell connection assembly and a fixing portion that extends substantially perpendicular to a plane of the PCB to engage the PCB to facilitate holding of the PCB relative to the physical cell connection assembly,
   wherein the fixing portion further includes a retaining clip that secures the at least one cell connector to the PCB, and
   wherein the retaining clip includes a retention tab, the retention tab being configured to be compressed by insertion of the retaining clip through the PCB and to expand responsive to the retention tab penetrating through to an opposite side of the PCB relative to a side of the PCB through which the retention tab is inserted, the retention tab in an expanded state preventing withdrawal of the retaining clip from the PCB.

2. The battery pack of claim 1, wherein each of the two soldering tabs are soldered, welded, or otherwise fastened to the PCB after being secured with the retaining clip.

3. The battery pack of claim 1 wherein the output connector includes an additional soldering tab for three point mechanical support relative to fixing the PCB prior to connecting the output connector to the PCB.

4. The battery pack of claim 1, wherein the two soldering tabs penetrate through the PCB in an opposite direction than the fixing portion penetrates though the PCB.

5. The battery pack of claim 1, wherein the two soldering tabs are soldered, welded, or otherwise fastened to the PCB after being provided through corresponding apertures in the PCB.

6. The battery pack of claim 1, wherein the fixing portion of at least some cell connectors of the plurality of cell connectors engage the PCB proximate to a first end of the PCB and the fixing portion of at least some other cell connectors of the plurality of cell connectors engage the PCB proximate to a second end of the PCB that is opposite of the first end of the PCB.

7. The battery pack of claim 1, wherein the two soldering tabs penetrate through the PCB in a direction away from the cells, and wherein the fixing portion penetrates through the PCB in a direction toward the cells.

8. The battery pack of claim 7, wherein at least one of the two soldering tabs penetrates the PCB at a portion of the PCB that is spaced apart from edges of the PCB that are penetrated by the fixing portion.

9. The battery pack of claim 1, wherein the battery pack is a backpack battery pack that is wearable by an operator of power outdoor power equipment.

10. Outdoor power equipment comprising:
    an electric motor;
    a working assembly powered by the electric motor; and
    a battery pack configured to power the electric motor, the battery pack comprising:
      a plurality of cells arranged substantially adjacent to each other such that longitudinal centerlines of each of the cells are aligned substantially in parallel with each other in a first direction;
      a physical cell connection assembly that includes a cell-retaining portion disposed to contact each of the cells to hold the cells in a housing;
      an electrical cell connection assembly that includes a plurality of cell connectors disposed to contact at least selected ones of the cells in groups to facilitate electrical connection of the cells associated with each of the groups, a contact portion of each of the cell connectors being disposed to electrically connect electrodes of at least two of the cells; and
      a printed circuit board (PCB) comprising sensing circuitry and configured to monitor electrical parameters associated with the cells based on electrical communication between the PCB and the electrical cell connection assembly; and an output connector including two soldering tabs, each of the two soldering tabs configured to pass through a preformed aperture in the PCB, wherein the sensing circuitry is configured to monitor a common output of the battery pack via electrical connection between the two soldering tabs, wherein at least one cell connector of the plurality of cell connectors includes a holding portion that engages the physical cell connection assembly and a fixing portion that extends substantially perpendicular to a plane of the PCB to engage the PCB to facilitate holding of the PCB relative to the physical cell connection assembly, wherein the fixing portion further includes a retaining clip that secures the at least one cell connector to the PCB, and wherein the retaining clip includes a retention tab, the retention tab being configured to be compressed by insertion of the retaining clip through the PCB and to expand responsive to the retention tab penetrating through to an opposite side of the PCB relative to a side of the PCB through which the retention tab is inserted, the retention tab in an expanded state preventing withdrawal of the retaining clip from the PCB.

11. The outdoor power equipment of claim 10, wherein each of the two soldering tabs are soldered, welded, or otherwise fastened to the PCB after being secured with the retainer clip.

12. The outdoor power equipment of claim 10, wherein the two soldering tabs penetrate through the PCB in a direction away from the cells, and wherein the fixing portion penetrates through the PCB in a direction toward the cells.

13. The outdoor power equipment of claim 10, wherein the output connector includes an additional soldering tab for three point mechanical support relative to fixing the PCB prior to connecting the output connector to the PCB.

14. The outdoor power equipment of claim 10, wherein the two soldering tabs penetrate through the PCB in an opposite direction than the fixing portion penetrates though the PCB.

15. The outdoor power equipment of claim 10, wherein the fixing portion of at least some cell connectors of the plurality of cell connectors engage the PCB proximate to a first end of the PCB and the fixing portion of at least some other cell connectors of the plurality of cell connectors engage the PCB proximate to a second end of the PCB that is opposite of the first end of the PCB.

16. A battery pack comprising:
a plurality of cells arranged substantially adjacent to each other such that longitudinal centerlines of each of the cells are aligned substantially in parallel with each other in a first direction;
a physical cell connection assembly that includes a cell-retaining portion disposed to contact each of the cells to hold the cells in a housing;
an electrical cell connection assembly that includes a plurality of cell connectors disposed to contact at least selected ones of the cells in groups to facilitate electrical connection of the cells associated with each of the groups, a contact portion of each of the cell connectors being disposed to electrically connect electrodes of at least two of the cells; and
a printed circuit board (PCB) comprising sensing circuitry and configured to monitor electrical parameters associated with the cells based on electrical communication between the PCB and the electrical cell connection assembly; and
an output connector including two soldering tabs, each of the two soldering tabs being configured to pass through a preformed aperture in the PCB,
wherein the sensing circuitry is configured to monitor a common output of the battery pack via electrical connection between the two soldering tabs,
wherein at least one cell connector of the plurality of cell connectors includes a locking assembly to facilitate holding of the PCB relative to the physical cell connection assembly,
wherein the locking assembly further includes a retaining clip that secures the at least one cell connector to the PCB, and
wherein the retaining clip includes a retention tab, the retention tab being configured to be compressed by insertion of the retaining clip through the PCB and expands responsive to the retention tab penetrating through to an opposite side of the PCB relative to a side of the PCB through which the retention tab is inserted, the retention tab in an expanded state preventing withdrawal of the retaining clip from the PCB.

17. The battery pack of claim 16, wherein the two soldering tabs penetrate through the PCB in a direction away from the cells, and wherein the fixing portion penetrates through the PCB in a direction toward the cells.

18. The battery pack of claim 16, wherein the output connector includes an additional soldering tab for three point mechanical support relative to fixing the PCB prior to connecting the output connector to the PCB.

19. The battery pack of claim 16, wherein the two soldering tabs penetrate through the PCB in an opposite direction than the fixing portion penetrates though the PCB.

20. The battery pack of claim 16, wherein the fixing portion of at least some cell connectors of the plurality of cell connectors engage the PCB proximate to a first end of the PCB and the fixing portion of at least some other cell connectors of the plurality of cell connectors engage the PCB proximate to a second end of the PCB that is opposite of the first end of the PCB.

* * * * *